(12) United States Patent
Brand

(10) Patent No.: US 12,321,275 B2
(45) Date of Patent: Jun. 3, 2025

(54) SYSTEM AND METHOD FOR CACHE PRE-WARMING

(71) Applicant: CTERA Networks, Ltd., Petach-Tikva (IL)

(72) Inventor: Aron Brand, Petach-Tikva (IL)

(73) Assignee: CTERA Networks Ltd., Petah-Tikva (IL)

( * ) Notice: Subject to any disclaimer, the term of this patent is extended or adjusted under 35 U.S.C. 154(b) by 50 days.

(21) Appl. No.: 16/390,419

(22) Filed: Apr. 22, 2019

(65) Prior Publication Data

US 2020/0334156 A1 Oct. 22, 2020

(51) Int. Cl.
*G06F 12/0862* (2016.01)
*G06F 3/06* (2006.01)
*G06F 16/172* (2019.01)

(52) U.S. Cl.
CPC .......... *G06F 12/0862* (2013.01); *G06F 3/061* (2013.01); *G06F 3/0647* (2013.01); *G06F 3/067* (2013.01); *G06F 16/172* (2019.01); *G06F 2212/1021* (2013.01); *G06F 2212/6026* (2013.01)

(58) Field of Classification Search
CPC ............... G06F 12/0862; G06F 16/172; G06F 2212/6026; G06F 2212/463; G06F 2212/1021; G06F 3/061; G06F 3/067; G06F 3/0647
See application file for complete search history.

(56) References Cited

U.S. PATENT DOCUMENTS

| | | | |
|---|---|---|---|
| 6,938,039 B1* | 8/2005 | Bober | G06F 16/119 707/827 |
| 2002/0120763 A1* | 8/2002 | Miloushev | H04L 67/1008 714/E11.034 |
| 2003/0110237 A1* | 6/2003 | Kitamura | G06F 16/10 709/219 |
| 2004/0148484 A1* | 7/2004 | Watanabe | G06F 12/0866 711/170 |
| 2006/0143393 A1* | 6/2006 | Petev | G06F 12/122 711/133 |
| 2006/0212667 A1* | 9/2006 | Mikami | G06F 12/0868 714/E11.107 |

(Continued)

FOREIGN PATENT DOCUMENTS

EP 2996025 A1 3/2016

OTHER PUBLICATIONS

Rajasingam et al., Data Migration Method using AFM, IBM, 2017. (Year: 2017).*

(Continued)

*Primary Examiner* — Kalpit Parikh
(74) *Attorney, Agent, or Firm* — M&B IP Analysts, LLC

(57) ABSTRACT

A system and method for cache pre-warming. The method includes creating a list of files likely to be accessed by a destination filesystem based on at least one access pattern of a source filesystem, the destination filesystem having a cache, wherein the list indicates a first plurality of files; and copying a second plurality of files from the source filesystem to the destination filesystem, wherein the second plurality of files includes the first plurality of files, wherein the destination filesystem is configured to prefetch files indicated in the list and to store the prefetched files in the cache.

29 Claims, 6 Drawing Sheets

(56) References Cited

U.S. PATENT DOCUMENTS

| | | | | |
|---|---|---|---|---|
| 2009/0222453 | A1* | 9/2009 | Naineni | G06F 16/172 |
| 2011/0066597 | A1* | 3/2011 | Mashtizadeh | G06F 3/0617 |
| | | | | 707/640 |
| 2011/0225412 | A1* | 9/2011 | Van De Ven | G06F 3/0643 |
| | | | | 713/2 |
| 2011/0258391 | A1* | 10/2011 | Atkisson | G06F 11/108 |
| | | | | 711/E12.017 |
| 2015/0039717 | A1 | 2/2015 | Chiu et al. | |
| 2015/0067759 | A1* | 3/2015 | Beard | H04L 63/10 |
| | | | | 726/1 |
| 2015/0356078 | A1* | 12/2015 | Kishimoto | G06F 16/1827 |
| | | | | 707/610 |
| 2016/0085575 | A1* | 3/2016 | Dornemann | G06F 11/2094 |
| | | | | 718/1 |
| 2016/0170978 | A1* | 6/2016 | Michael | G06F 16/214 |
| | | | | 707/609 |

OTHER PUBLICATIONS

Zhang, Yiying, et al. "Warming Up Storage-Level Caches with Bonfire." Presented as part of the 11th {USENIX} Conference on File and Storage Technologies ({FAST} 13). 2013. (Year: 2013).*

Lu, Tao, et al. "Successor: Proactive cache warm-up of destination hosts in virtual machine migration contexts." IEEE INFOCOM 2016—The 35th Annual IEEE International Conference on Computer Communications. IEEE, 2016. (Year: 2016).*

Zhang et al., "Warming up Storage-Level Caches with Bonfire", The 11th USENIX Conference on File and Storage Technologies (FAST '13), 2013, pp. 59-72.

* cited by examiner

SYSTEM AND METHOD FOR CACHE PRE-WARMING

TECHNICAL FIELD

The present disclosure relates generally to caches, and more particularly to pre-warming caches.

BACKGROUND

A cache is a hardware or software component that stores data used to accelerate requests. The cache may store data that is likely to be accessed in the near future such as, for example, results of earlier computations, data that is accessed frequently or has otherwise been accessed recently, and the like. The cached data may be intermediate data (e.g., the results of earlier computations) or copies of data stored elsewhere.

During the course of normal business operations, companies commonly migrate files from a source filesystem to a destination filesystem. For example, files may be migrated from an old file server to a cloud storage system by means of a caching gateway. Immediately following such migrations, the cache of the destination filesystem is "cold", that is, it does not contain those files that are frequently accessed, and needs to warm up before becoming effective. When the size of the cache is large and the underlying storage system is slow, the initial cache warmup period can take hours or even days. This long warmup period dramatically affects user experience as well as performance of application workloads.

Existing solutions for addressing the challenges in cache warmup periods include pre-warming the cache prior to a cutover in which users are transitioned to the system using the new cache. To this end, such existing solutions may include pre-fetching files that are likely to be accessed and storing the pre-fetched files in the cache of the destination filesystem. Specifically, existing solutions may include storing contents of the source filesystem's cache to the destination filesystem's cache. However, these solutions face challenges when the cache of the source filesystem has different properties than the cache of the destination filesystem (for example, when the caches are different sizes). These challenges are particularly notable for migration from traditional filesystems to a caching gateway or caching agent.

Other existing solutions include pre-warming the destination cache on the block level based on block level activity of an application prior to migration. However, these solutions also face challenges due to differences between the source filesystem cache and the destination filesystem cache. In particular, these solutions do not work when the source and destination filesystems use dissimilar layouts and on-disk storage structures because the access patterns of the source filesystem are not applicable to the destination filesystem.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cache pre-warming. The method comprises: creating a list of files likely to be accessed by a destination filesystem based on at least one access pattern of a source filesystem, the destination filesystem having a cache, wherein the list indicates a first plurality of files; and copying a second plurality of files from the source filesystem to the destination filesystem, wherein the second plurality of files includes the first plurality of files, wherein the destination filesystem is configured to prefetch files indicated in the list and to store the prefetched files in the cache.

Certain embodiments disclosed herein also include a non-transitory computer readable medium having stored thereon causing a processing circuitry to execute a process, the process comprising: creating a list of files likely to be accessed by a destination filesystem based on at least one access pattern of a source filesystem, the destination filesystem having a cache, wherein the list indicates a first plurality of files; and copying a second plurality of files from the source filesystem to the destination filesystem, wherein the second plurality of files includes the first plurality of files, wherein the destination filesystem is configured to prefetch files indicated in the list and to store the prefetched files in the cache.

Certain embodiments disclosed herein also include a system for cache pre-warming. The system comprises: a processing circuitry; and a memory, the memory containing instructions that, when executed by the processing circuitry, configure the system to: create a list of files likely to be accessed by a destination filesystem based on at least one access pattern of a source filesystem, the destination filesystem having a cache, wherein the list indicates a first plurality of files; and copy a second plurality of files from the source filesystem to the destination filesystem, wherein the second plurality of files includes the first plurality of files, wherein the destination filesystem is configured to prefetch files indicated in the list and to store the prefetched files in the cache.

Certain embodiments disclosed herein also include a method for filesystem migration, comprising: creating a list of files likely to be accessed by a destination filesystem, the destination filesystem having a cache, wherein the list indicates a first plurality of files, wherein the list of files likely to be accessed by the destination filesystem is determined based on a second plurality of files stored in the source filesystem, wherein the second plurality of files includes the first plurality of files, wherein the second plurality of files further includes a third plurality of files that is not included in the list of the first plurality of files, wherein the copying is performed according to a copy order such that the first plurality of files is copied before the third plurality of files; and copying the second plurality of files from the source filesystem to the destination filesystem, wherein the copying is performed according to a copy order such that the first plurality of files is copied before the third plurality of files.

Certain embodiments disclosed herein also include a method for filesystem migration, comprising: copying a plurality of files from a source filesystem to a destination filesystem, the destination filesystem including a cache, the plurality of files having a plurality of timestamp attributes, wherein the destination filesystem is a cloud filesystem exposed by a caching gateway, wherein the plurality of files is copied such that the plurality of timestamp attributes is preserved; and dynamically adjusting a speed of the copying of the plurality of files based on a utilization of the cache.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
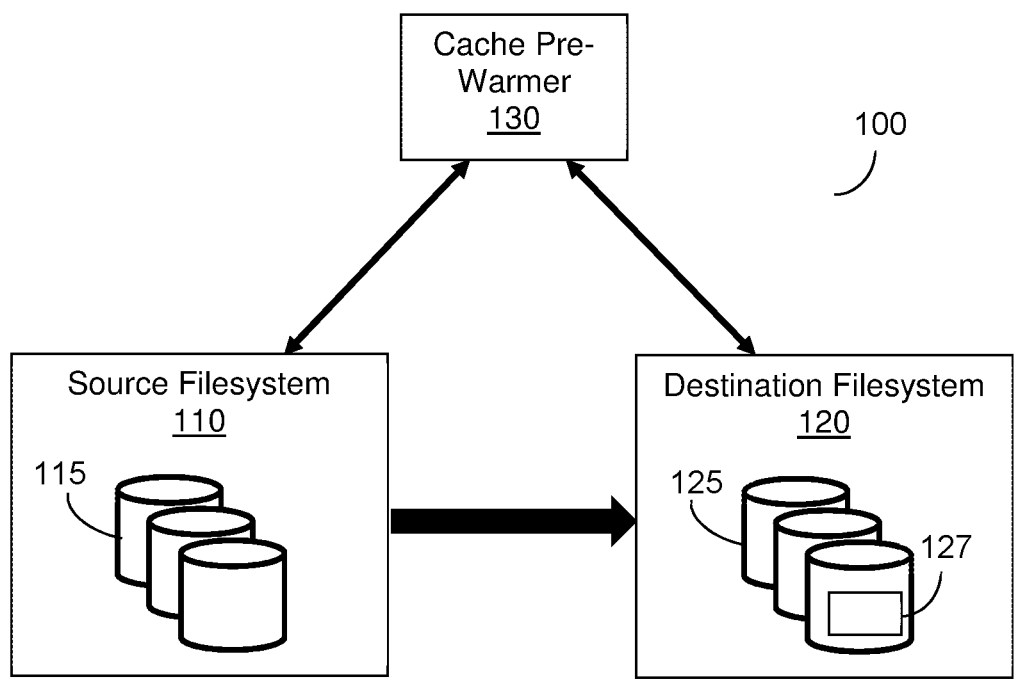
FIG. 1 is a migration diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for cache pre-warming and a file system migration process including the disclosed cache pre-warming. In an embodiment, the disclosed pre-warming includes analyzing data related to access of files in a source filesystem. Such access data may include, but is not limited to, timestamp attributes, access logs, or both. A list of files that are likely to be accessed soon after migration, referred to as "hot listed files", is created based on the analysis. Hot-listed files may be accessed, or marked as recently accessed, in order to cause pre-fetching of hot-listed files that are not already in a cache and to prevent hot-listed files that are in the cache from being prematurely evicted, thereby pre-warming a cache.

The disclosed pre-warming may be utilized during a filesystem migration from a source filesystem to a destination filesystem. In an example implementation, such migration may include copying files from the source filesystem to the destination filesystem, disabling writes to the source filesystem, pre-warming a cache of the destination filesystem, and performing a cutover such that users attempting to access files are redirected to the destination filesystem. In an embodiment, the pre-warming is performed as described herein.

The disclosed embodiments provide solutions to the challenges noted above by providing techniques for pre-warming caches that may be applied even when source and destination filesystems are dissimilar. More specifically, the disclosed embodiments do not rely on the destination filesystem being deployed with identical configurations as the source filesystem with respect to hardware, disk layout, operating system, cache size, cache configuration, and the like. Moreover, the disclosed embodiments include improved techniques for pre-warming caches that reduce warm-up time following filesystem migration.

FIG. 1 shows an example migration diagram 100 utilized to describe the various disclosed embodiments. In the example migration diagram 100, files from a source filesystem 110 are migrated to a destination filesystem 120 in tandem with cache preparation by a cache pre-warmer 130. Communications among the source filesystem 110, the destination filesystem 120, and the cache pre-warmer 130 may be facilitated by one or more networks such as, but is not limited to, a wireless, cellular or wired network, a local area network (LAN), a wide area network (WAN), a metro area network (MAN), the Internet, the worldwide web (WWW), similar networks, and any combinations thereof.

The source filesystem 110 and the destination filesystem 120 include storages 115 and 125, respectively. During migration, files in the storages 115 are migrated into the storages 125. The source filesystem 110, the destination filesystem 120, or both, may be implemented as or using a cloud storage system (not shown).

The destination filesystem 120 further includes a cache 127. The cache 127 is configured to store data to allow for faster access of the stored data. In an embodiment, the cache pre-warmer 130 is configured to pre-warm the cache 127 by determining files that are likely to be accessed. The cache pre-warmer is further configured to cause the destination filesystem 120 to pre-fetch the determined files and to store the pre-fetched files in the cache 127 in accordance with the disclosed embodiments.

In an embodiment, the cache 127 may be configured with a least recently used (LRU, also known as least recently accessed) eviction policy which evicts files or portions thereof which are least recently used, for example, as indicated by access timestamps. To avoid eviction of files determined as likely to be accessed, the cache pre-warmer 130 is configured to access the files and to cause pre-fetching of the accessed files. Because the files are therefore accessed recently, a LRU eviction policy will not evict those accessed files.

The disclosed embodiments may also be applied to pre-warm a new caching gateway when, for example, a previous caching gateway has failed. When a previous caching gateway has failed, it is desirable to warm a new cache gateway as soon as possible and before users begin to access the new caching gateway. For this purpose, access data is collected from endpoints such as caching gateways and agents, and is stored in an access data repository.

Figure 5:
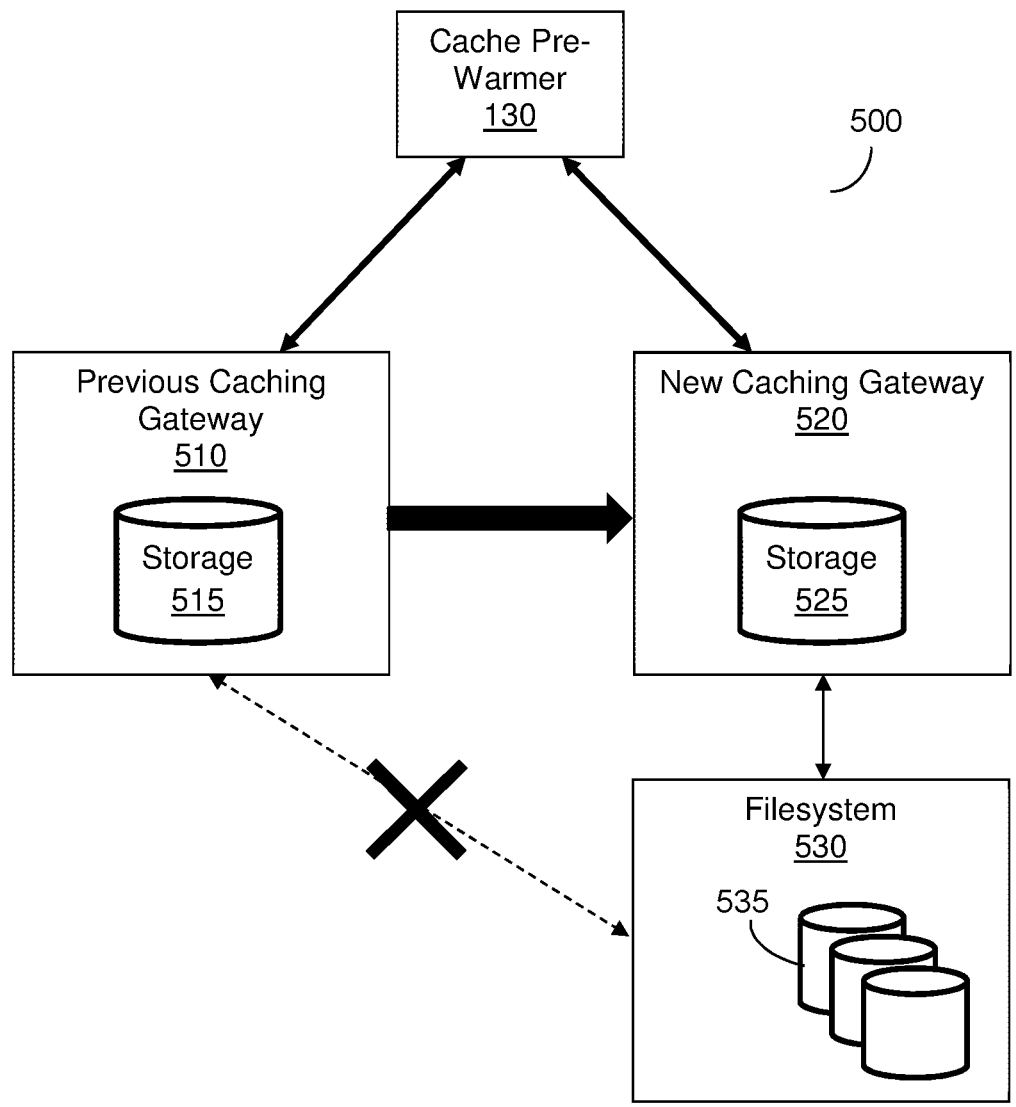
FIG. 5 is a gateway transition diagram utilized to describe pre-warming a new caching gateway when a previous caching gateway has filed.

FIG. 5 is an example gateway transition diagram 500 utilized to illustrate such application. In the diagram 500, a previous caching gateway 510 has failed, thereby requiring deployment of a new caching gateway 520 to provide caching functions for a filesystem 530. Each caching gateway 510 and 520 includes a storage 515 or 525, respectively, which stores cached data to allow faster access. The filesystem 530 includes one or more storages including data it maintains. An access data repository 535 stores data that may be utilized to determine access patterns as described herein.

The cache pre-warmer 130 is configured to retrieve access data as described herein from the access data repository 535, to create a list of files likely to be accessed soon, and to cause pre-fetching of the listed files by the new caching gateway 520.

It should be noted that the access data repository 535 is depicted in FIG. 5 as part of the filesystem 530, but that the filesystem 530 and the access data repository 535 may be separate entities without departing from the scope of the disclosed embodiments.

Returning to FIG. 1, it should be noted that the disclosed embodiments are not limited to the arrangement of components shown in FIG. 1. For example, the cache pre-warmer may be included in the new caching gateway 520, FIG. 5 (e.g., as software) without departing from the scope of the disclosed embodiments. Further, the disclosed embodiments may be equally applicable to filesystems having other components that provide caching functions such as, for example, a caching gateway or caching agent (not shown). An example caching gateway is described further in U.S. patent application Ser. No. 14/572,067. An example caching agent is described further in U.S. patent application Ser. No. 16/040,970, assigned to the common assignee, the contents of which are hereby incorporated by reference.

It should also be noted that the cache 127 is depicted as being included in the destination filesystem 120, but that the cache 127 may be equally deployed external to the destination filesystem 120 (e.g., in a caching gateway external to the destination filesystem 120) without departing from the scope of the disclosure.

Figure 2:
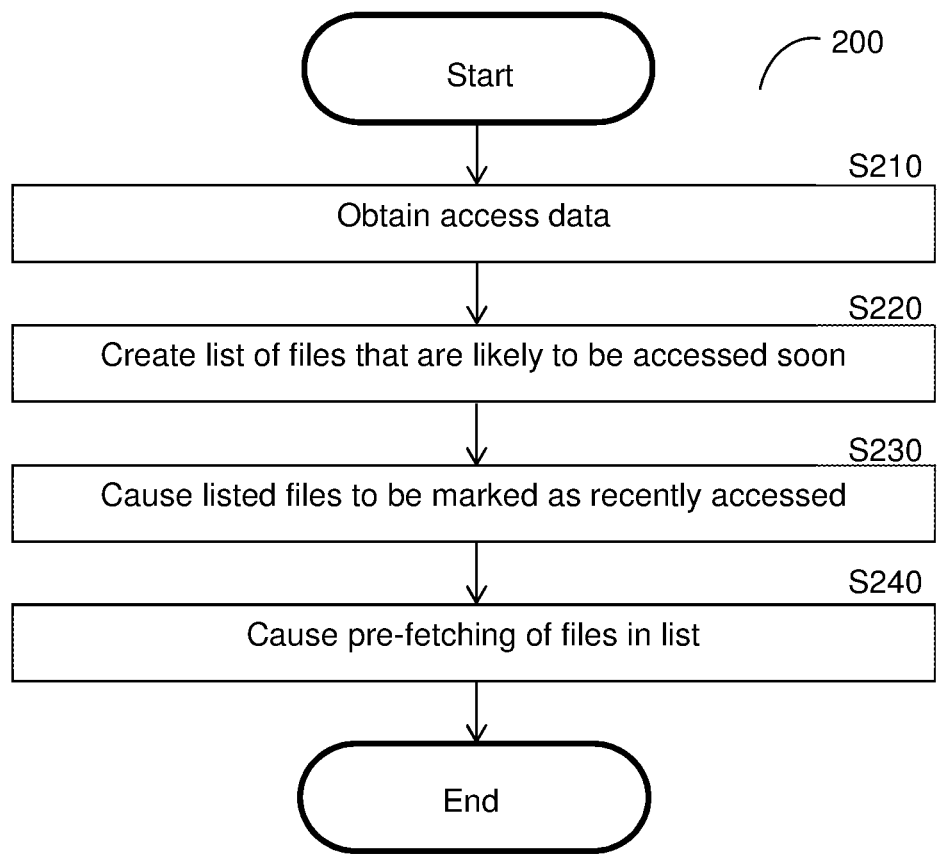
FIG. 2 is a flowchart illustrating a method for cache pre-warming according to an embodiment.

FIG. 2 is an example flowchart 200 illustrating a method for cache pre-warming according to an embodiment. In an embodiment, the method is performed by the cache pre-warmer 130, FIG. 1. The method is performed for a destination filesystem based on access data related to files in a source filesystem. The cache to be pre-warmed may be a cache included in the destination filesystem, a caching gateway, a caching agent, and the like. The cache may be included in the destination filesystem or external to the destination filesystem.

At S210, access data is obtained. The access data is related to access of files or portions thereof in the source filesystem and may include, but is not limited to, timestamp attributes, access logs, both, and the like. The timestamp attributes may indicate, for example, the last time at which a file was accessed, the creation time for a file, the last time at which a file was modified, and the like. The access logs may indicate data related to access of files such as, but not limited to, geographical locations from which each file is accessed, users who accessed each file, and the like. The access data may be stored, for example, in the source filesystem or in an external source of the source filesystem (e.g., a system of an access pattern service).

At S220, based on the access data, a list of files likely to be accessed soon is created. The list includes files to be stored in a cache for faster access. In an embodiment, the list may further indicate relative likelihood of access soon. Such relative likelihoods of access may be utilized, for example, to reorder a copying process as described below with respect to S310.

In an embodiment, the list includes files or portions (e.g., ranges of bytes) of files that were recently accessed, modified, or created. To this end, S220 may further include determining one or more recent files based on the timestamp attributes. It has been identified that files having timestamps indicating recent access, creation, or modification are likely to be accessed again soon and, therefore, timestamps may be utilized to accurately determine which files are best to cache. Files may be recently accessed, modified, or created, when such action was performed within a predetermined threshold amount of time (different thresholds may be utilized for access, modification, and creation).

In another embodiment, the list includes files or portions of files that are determined to be likely to be accessed soon based on historical access data (e.g., as indicated by access logs). To this end, S220 may further include analyzing the historical access data to determine which files are likely to be accessed based on access of those specific files, access of similar files (e.g., files of the same type or in the same location in storage), times of access as compared to the current time, files accessed by the same clients, and the like. In a further embodiment, the historical access data may be performed in parallel to copying of files from a source filesystem to a destination filesystem (e.g., as described below with respect to S310).

In some implementations, the list may be created using machine learning. To this end, in an embodiment, S220 may include applying a machine learning model to features extracted from the access data. The machine learning model is trained to predict file accesses based on training data including access data.

At optional S230, the listed files may be caused to be marked as recently accessed. In an embodiment, S230 includes accessing the listed files, thereby causing the timestamp indicating the time of access to be updated with a recent time for each listed file. In another embodiment, an instruction is sent to the destination filesystem to mark the listed files as recently accessed without actually accessing the files. Marking the files as recently accessed causes a least recently used eviction policy to identify the files as not to be evicted.

At S240, each of the listed files or portions of files not already stored in the cached is pre-fetched into the cache. In an embodiment, S240 may further include marking any of the listed files that are already stored in the cache as recently accessed, thereby reducing the likelihood that they will be prematurely evicted from the cache. The files already stored in the cache may be marked with an updated time, for example a time of the access described above with respect to S230. The pre-fetched files or portions thereof are stored in a cache of the destination filesystem.

In an alternative embodiment, S240 may include causing pre-fetching of metadata of files in the list. Thus, a cache may be populated with metadata instead of the actual data of those files, thereby resulting in quick response to directory listings but without warming the cache using the actual data.

Figure 3:
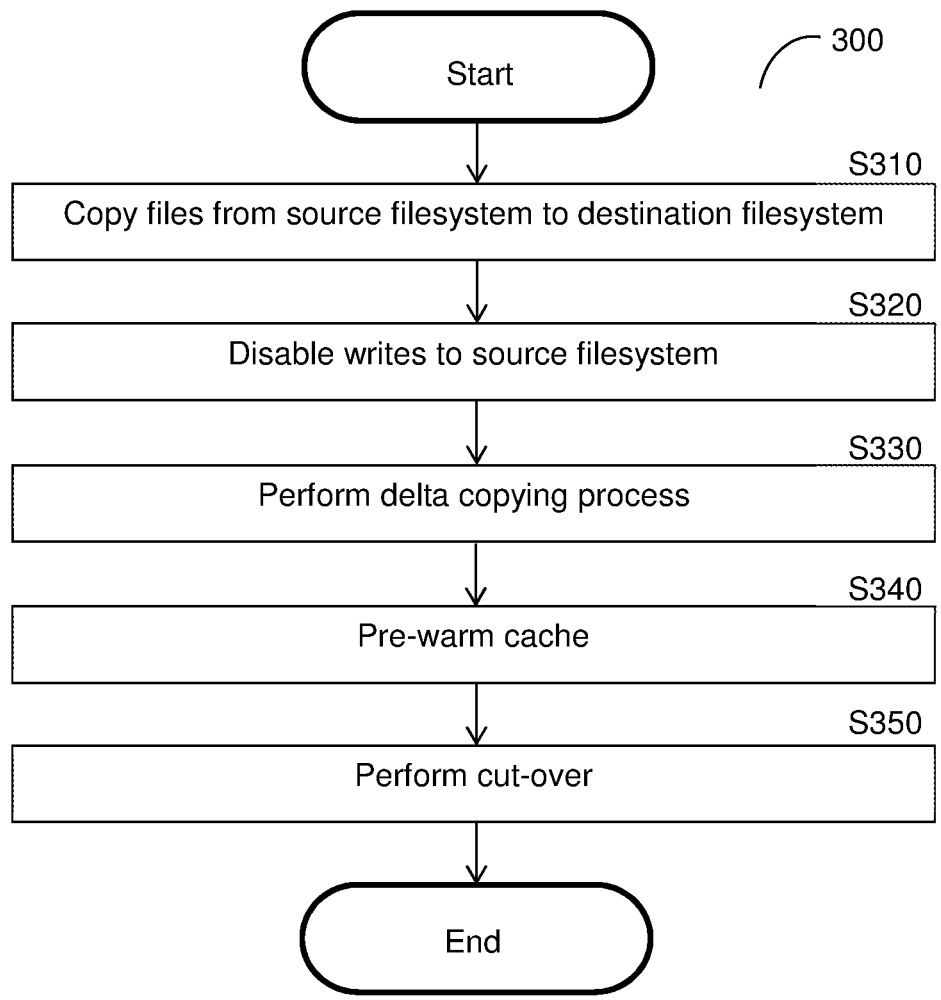
FIG. 3 is a flowchart illustrating a method for file system migration using cache pre-warming according to an embodiment.

FIG. 3 is an example flowchart 300 illustrating a method for migrating data from a source filesystem to a destination filesystem according to an embodiment. The destination filesystem has a cache included therein or otherwise accessible to the destination filesystem. In an embodiment, the method is performed by the cache pre-warmer 130, FIG. 1.

At S310, files are copied from the source filesystem to the destination filesystem. In an embodiment, S310 may be performed in parallel with S330.

In an embodiment, to reduce the likelihood that evicted files are pre-fetched again prior to cut-over (which requires increased use of computing resources), the files are copied according to a copy order that is arranged based on likelihood of access, for example as determined during the pre-warming.

By migrating files that are more likely to be accessed later in the copying process, operation of the cache may be improved. Specifically, files that are more likely to be accessed than other files may be copied later in the copying process than those other files. As a result, it becomes less likely that files are evicted only to be pre-fetched again prior to a cutover.

In another embodiment, the cache is a write-back cache, for example, in case of a caching gateway, files are stored in a cache, and then those files are committed in the background to a more durable storage tier, such as a cloud storage service. Files which were written to the cache but not yet committed to long-term storage are considered "dirty". It should be recognized that a "dirty" file cannot be evicted for the cache since this would cause them to be lost.

It has been identified that, during copying of files, a write-back cache may become saturated with dirty files that are not likely to be accessed soon but and, therefore, cannot be evicted from the cache. When this occurs, the cache may be forced to inappropriately evict files that are likely to be accessed soon. This problem may occur, for example, in a caching gateway, when the speed of committing files to the cloud storage service is substantially slower than the speed of copying files from the source filesystem over the local area network. To solve this problem, in an embodiment, S310 further includes dynamically throttling the copying process to prevent cache saturation. In a further embodiment, the copying process is dynamically adjusted based on utilization of the cache to account for this problem.

More specifically, in an embodiment, the copying of files may be slowed as the cache approaches saturation (e.g., when an amount of dirty data stored in the cache is above a threshold). Slowing down the copying provides more time to commit the dirty files to the durable storage tier, thereby making eviction of these files permissible. In turn, this reduces the likelihood of evicting files that are likely to be accessed soon and, therefore, reduces the amount of redundant pre-fetching of the same files.

Figure 6:
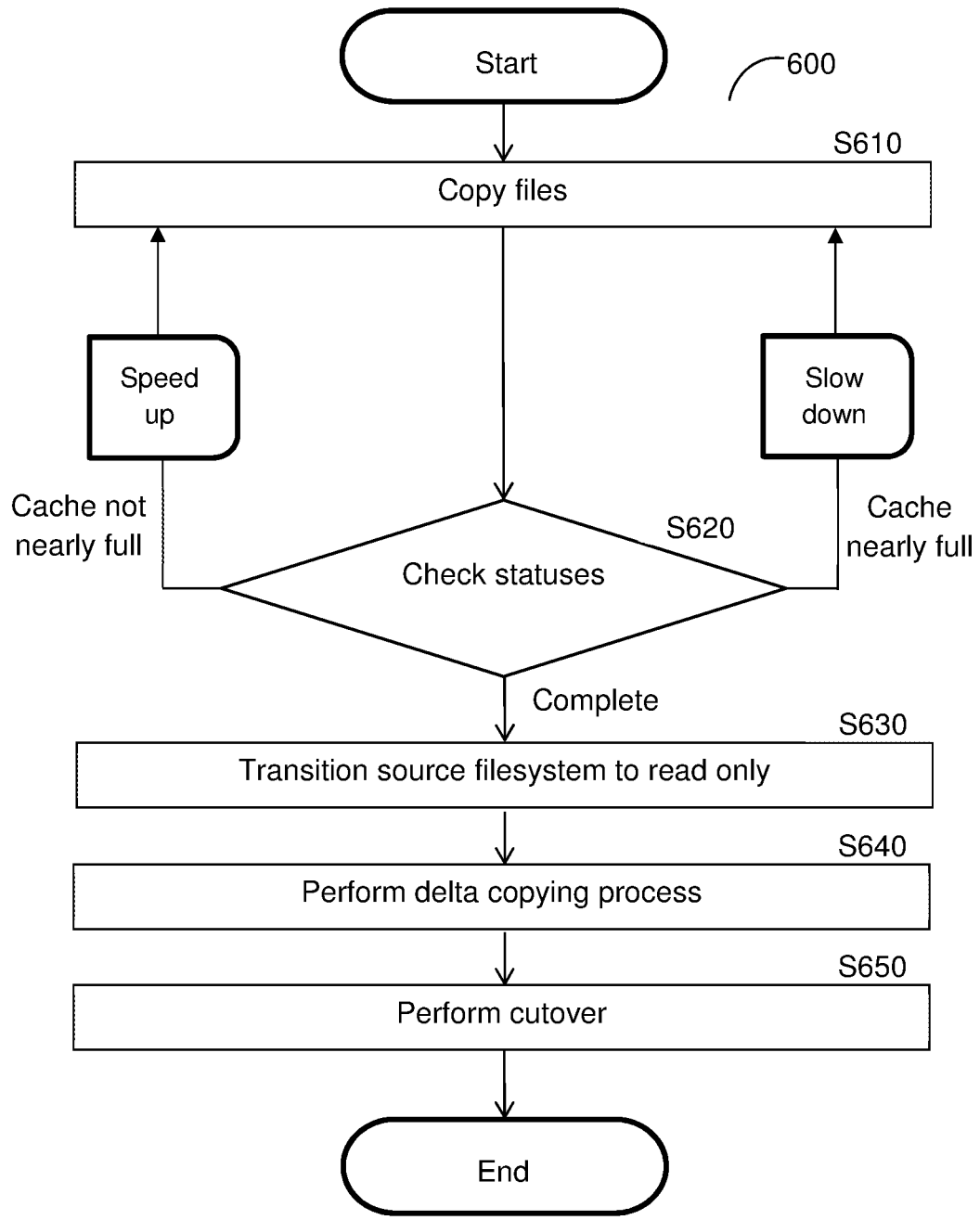
FIG. 6 is a flowchart illustrating dynamic adjustment of copying based on cache utilization according to an embodiment.

FIG. 6 is an example flowchart 600 illustrating dynamic adjustment of copying based on cache utilization according to an embodiment. At S610, files are copied from a source filesystem to a destination filesystem. At S620, statuses of a cache of the destination filesystem as well as the copying process are checked. The statuses may be checked, for example, periodically over time. When the copying process is not complete, S610 continues with copying of more files. If the cache is not nearly full (e.g., below a threshold percentage full), the copying process is sped up; otherwise, the copying process is slowed down. When the copying process is complete, execution continues with S630. At S630, the source filesystem is transitioned to read only. At S640, a delta copying process is performed. The delta copying process ensures that any changes to the source filesystem since copying began are captured after the source filesystem is transitioned to read only. At S650, a cutover is performed such that clients subsequently attempting to access the source filesystem are redirected to the destination filesystem.

Returning to FIG. 3, in a further embodiment, the files are copied so as to preserve their original timestamps and, in particular, timestamps indicating last access times. Preserving the timestamps allows for accurate prioritization of file eviction since files that were accessed less recently are more likely better to evict than files that were accessed more recently.

At S320, writes to the source filesystem are disabled. At S330, a delta copying process is performed between the source filesystem and the destination filesystem. The delta copying process allows for updating the destination filesystem based on any changes to the source filesystem that have occurred since the start of S310. At S340, the cache of the destination filesystem is pre-warmed. In an embodiment, the cache is pre-warmed as described above with respect to FIG. 2. At S350, a cut-over is performed such that clients attempting to access files of the source filesystem are redirected to the destination filesystem.

It should be noted that the method of FIG. 3 is shown in a particular order merely for simplicity purposes, and that at least some of the steps may be performed in a different order or in parallel without departing from the scope of the disclosure. In particular, the pre-warming may be at least partially performed in parallel with the copying of files. More specifically, files may be copied in parallel with creation of the list of files that are likely to be accessed. This allows for dynamic throttling of the speed of file copying, which in turn provides for evicting files from the cache that are less likely to be accessed, thereby reducing the likelihood that the files that are likely to be accessed are evicted.

Figure 4:
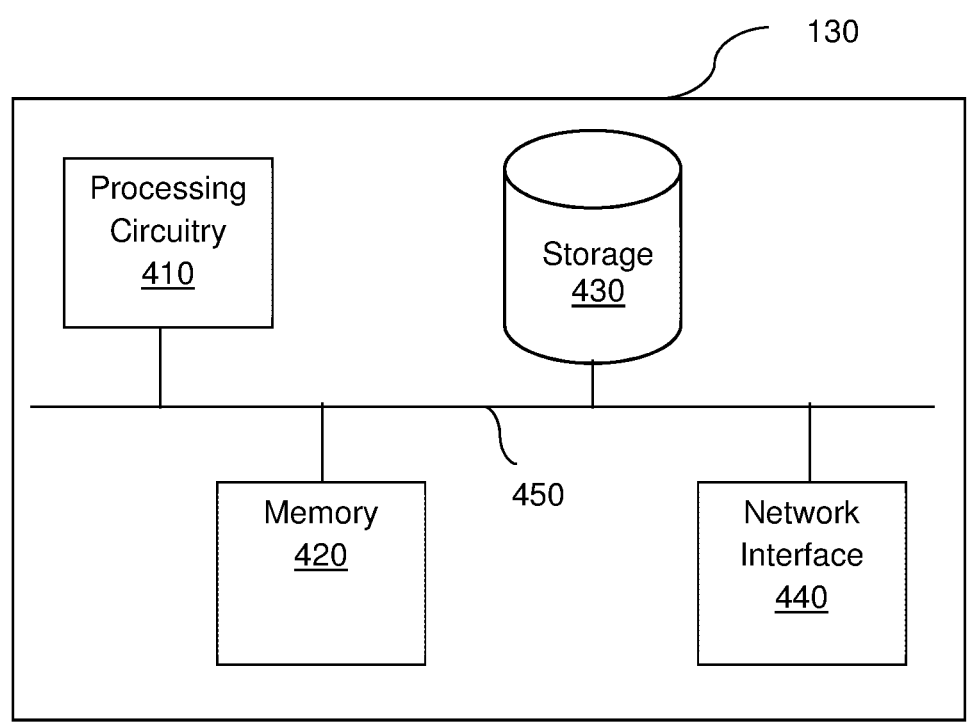
FIG. 4 is a schematic diagram illustrating a cache pre-warmer according to an embodiment.

FIG. 4 is an example schematic diagram of a cache pre-warmer 130 according to an embodiment. The cache pre-warmer 130 includes a processing circuitry 410 coupled to a memory 420, a storage 430, and a network interface 440. In an embodiment, the components of the cache pre-warmer 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the cache pre-warmer 130 to communicate with the source filesystem 110 for the purpose of, for example, analyzing and copying files. Further, the network interface 440 may allow the cache pre-warmer 130 to communicate with the destination filesystem 120 for the purpose of sending lists of files for pre-fetching.

It should be understood that the embodiments described herein are not limited to the specific architecture illustrated in FIG. 4, and other architectures may be equally used without departing from the scope of the disclosed embodiments. In particular, the cache pre-warmer 130 may be equally implemented as software, for example, included in a caching gateway or as a component of a cloud storage system. As a non-limiting example, the pre-warmer 130 may be included in the destination filesystem 120 and used as part of its initial warming up procedure following a cold start.

It should be noted that various disclosed embodiments are discussed with respect to accessing files and filesystems for simplicity, but that the disclosed embodiments may be equally implemented with respect to sub-granular portions of files instead of or in addition to entire files. In particular, the disclosed embodiments may utilize access data related to portions of files (e.g., specific byte ranges within files), and may include pre-fetching such portions of files.

Using portions of files allows for providing better performance for files that are large, as only the relevant portions of the file need to be pre-fetched and stored in a cache. Additionally, allowing use of portions of files also allows the disclosed embodiments to be applied to destination filesystems that operate on such a sub-granular level, regardless of whether the source filesystem supports such sub-granularity. An example filesystem operating on a sub-granular level is described further in U.S. Pat. No. 10,061,779, assigned to the common assignee, the contents of which are hereby incorporated by reference.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for pre-warming a cache in a destination filesystem, comprising:
   creating, by a cache pre-warmer, a list of files likely to be accessed by a filesystem of a destination that is already operational based on at least one access pattern of a source filesystem, wherein the list indicates a first plurality of files; and
   copying a second plurality of files from the source filesystem to the destination filesystem, wherein the second plurality of files includes the first plurality of files, wherein the destination filesystem is configured to prefetch, after the copying, files indicated in the list from the destination filesystem and to store the prefetched files in the destination filesystem cache, wherein a size in total of the second plurality of files exceeds a size of the cache in the destination filesystem and wherein the cache in the destination filesystem has an eviction policy that is active during the both the copying and prefetching of the files of the list.

2. The method of claim 1, wherein the at least one access pattern is determined based on at least one of: an access log of the source filesystem, and a plurality of timestamp attributes of the source filesystem.

3. The method of claim 1, wherein the list of the first plurality of files is created in parallel with the copying of the second plurality of files.

4. The method of claim 1, wherein the list of files is created in parallel to the copying of the plurality of files from the source filesystem to the destination filesystem.

5. The method of claim 1, further comprising:
   disabling writes to the source filesystem;
   performing a cutover from the source filesystem to the destination filesystem; and
   redirecting client devices attempting to access data from the source filesystem to the destination filesystem when the cutover has been performed.

6. The method of claim 1, wherein the second plurality of files further includes a third plurality of files that is not included in the list of the first plurality of files, wherein the copying is performed according to a copy order such that the first plurality of files is copied before the third plurality of files.

7. The method of claim 1, wherein the copying of the second plurality of files from the source filesystem to the destination filesystem is performed in reverse order with respect to a determined likelihood of their being accessed.

8. The method of claim 6, wherein the access data related to the source filesystem includes a plurality of timestamp attributes, wherein the second plurality of files is copied such that the plurality of timestamp attributes is preserved.

9. The method of claim 1, further comprising:
   dynamically throttling a speed of the copying of the second plurality of files based on a proportion of dirty files in the cache of the destination filesystem, wherein the cache of the destination filesystem is a write-back cache.

10. The method of claim 1 wherein the cache is configured to utilize a least recently used eviction policy, further comprising:
causing at least one file of the list of files to be marked as recently accessed.

11. The method of claim 1, further comprising:
determining, based on the at least one access pattern, at least one of the first plurality of files having an access frequency above a threshold, wherein the destination filesystem is configured not to evict the determined at least one of the first plurality of files.

12. The method of claim 1, wherein the at least one access pattern is determined based on data stored in a system that is external to the source filesystem.

13. The method of claim 1, wherein the cache pre-warmer is outside of the source filesystem and the target filesystem.

14. A non-transitory computer readable medium having stored thereon instructions for causing a processing circuitry in a cache pre-warmer to execute a process for pre-warming a cache in a destination filesystem, the process comprising:
creating, by the cache pre-warmer, a list of files likely to be accessed by a filesystem of a destination that is already operational based on at least one access pattern of a source filesystem, wherein the list indicates a first plurality of files; and
copying a second plurality of files from the source filesystem to the destination filesystem, wherein the second plurality of files includes the first plurality of files, wherein the destination filesystem is configured to prefetch, after the copying, files indicated in the list from the destination filesystem and to store the prefetched files in the destination filesystem cache, wherein a size in total of the second plurality of files exceeds a size of the cache in the destination filesystem and wherein the cache in the destination filesystem has an eviction policy that is active during the both the copying and prefetching of the files of the list.

15. A system for pre-warming a cache in a destination filesystem, comprising:
a processing circuitry; and
a memory, the memory containing instructions that, when executed by the processing circuitry, configure the system to:
create, by a cache pre-warmer, a list of files likely to be accessed by a filesystem of a destination that is already operational based on at least one access pattern of a source filesystem, wherein the list indicates a first plurality of files; and
copy a second plurality of files from the source filesystem to the destination filesystem, wherein the second plurality of files includes the first plurality of files, wherein the destination filesystem is configured to prefetch, after the copying, files indicated in the list from the destination filesystem and to store the prefetched files in the destination filesystem cache, wherein a size in total of the second plurality of files exceeds a size of the cache in the destination filesystem and wherein the cache in the destination filesystem has an eviction policy that is active during the both the copying and prefetching of the files of the list.

16. The system of claim 15, wherein the at least one access pattern is determined based on at least one of: an access log of the source filesystem, and a plurality of timestamp attributes of the source filesystem.

17. The system of claim 15, wherein the list of the first plurality of files is created in parallel with the copying of the second plurality of files.

18. The system of claim 15, wherein the list of files is created in parallel to the copying of the plurality of files from the source filesystem to the destination filesystem.

19. The system of claim 15, wherein the system is further configured to:
disable writes to the source filesystem;
perform a cutover from the source filesystem to the destination filesystem; and
redirect client devices attempting to access data from the source filesystem to the destination filesystem when the cutover has been performed.

20. The system of claim 15, wherein the second plurality of files further includes a third plurality of files that is not included in the list of the first plurality of files, wherein the copying is performed according to a copy order such that the first plurality of files is copied before the third plurality of files.

21. The system of claim 15, wherein the files of the list are copied in reverse order with respect to a determined likelihood of their being accessed.

22. The system of claim 21, wherein the access data related to the source filesystem includes a plurality of timestamp attributes, wherein the second plurality of files is copied such that the plurality of timestamp attributes is preserved.

23. The system of claim 22, wherein the system is further configured to:
dynamically throttle a speed of the copying of the second plurality of files based on a speed of a cloud upload process to a cloud filesystem.

24. The system of claim 15 wherein the cache is configured to utilize a least recently used eviction policy, wherein the system is further configured to:
cause at least one file of the list of files to be marked as recently accessed.

25. The system of claim 15, wherein the system is further configured to:
determine, based on the at least one access pattern, at least one of the first plurality of files having an access frequency above a threshold, wherein the destination filesystem is configured not to evict the determined at least one of the first plurality of files.

26. The system of claim 15, wherein the at least one access pattern is determined based on data stored in a system that is external to the source filesystem.

27. A method for filesystem migration that results in a cache in a destination filesystem being pre-warmed, comprising:
creating, by a cache pre-warmer, a list of files likely to be accessed by a filesystem of a destination that is already operational, wherein the list indicates a first plurality of files, wherein the list of files likely to be accessed by the destination filesystem is determined based on a second plurality of files stored in a source filesystem, wherein the second plurality of files includes the first plurality of files, wherein the second plurality of files further includes a third plurality of files that is not included in the list of the first plurality of files, wherein copying of files from the source filesystem to the destination filesystem is performed according to a copy order such that the first plurality of files is copied before the third plurality of files; and
copying the second plurality of files from the source filesystem to the destination filesystem, wherein the copying is performed according to a copy order such that the first plurality of files is copied before the third plurality of files, wherein a size in total of the second plurality of files exceeds a size of the cache in the destination filesystem and wherein the cache in the destination filesystem has an eviction policy that is active during the copying.

28. A method for filesystem migration that results in a cache in a destination filesystem being pre-warmed, comprising:

copying a plurality of files from a source filesystem to a filesystem of a destination that is operational, the plurality of files having a plurality of timestamp attributes, wherein the destination filesystem is a cloud filesystem exposed by a caching gateway, wherein the plurality of files is copied such that the plurality of timestamp attributes is preserved; and dynamically adjusting a speed of the copying of the plurality of files based on a utilization of the cache, wherein a size in total of the plurality of files exceeds a size of the cache in the destination filesystem and wherein the cache in the destination filesystem has an eviction policy that is active during the copying.

29. The method of claim 28, further comprising:

disabling writes to the source filesystem;

performing a cutover from the source filesystem to the destination filesystem; and redirecting client devices attempting to access data from the source filesystem to the destination filesystem when the cutover has been performed.

* * * * *